July 28, 1925.  
C. R. DOWNS  
PROCESS FOR THE PRODUCTION OF SULPHURIC ACID  
Filed March 20, 1924  
1,547,167
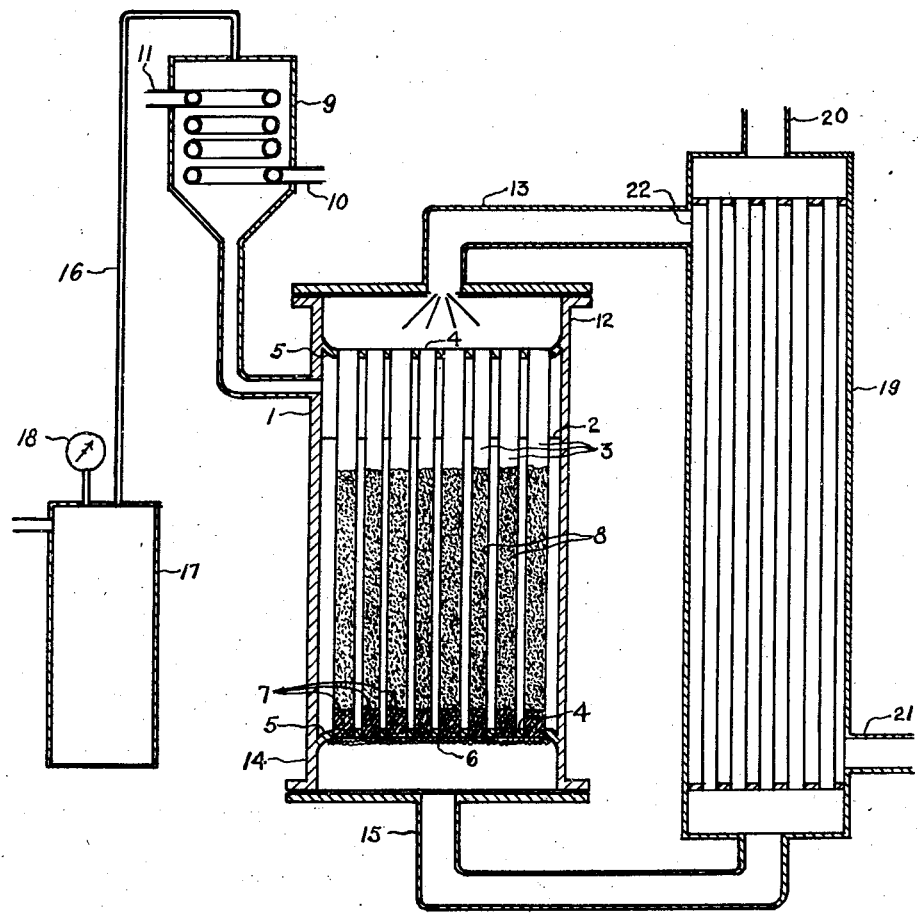
Charles Raymond Downs  INVENTOR.

Patented July 28, 1925.

1,547,167

UNITED STATES PATENT OFFICE.

CHARLES RAYMOND DOWNS, OF NEW HAVEN, CONNECTICUT.

PROCESS FOR THE PRODUCTION OF SULPHURIC ACID.

Application filed March 20, 1924. Serial No. 700,482.

*To all whom it may concern:*

Be it known that I, CHARLES RAYMOND DOWNS, a citizen of the United States, and residing at 813 Quinnipiac Avenue, in the city of New Haven, county of New Haven, and State of Connecticut, have invented certain new and useful Improvements in Processes for the Production of Sulphuric Acid, of which the following is a specification.

This invention relates to an improvement in the process of oxidizing sulphur dioxide to sulphur trioxide by means of oxygen-containing gases in the presence of a catalyst at elevated temperatures.

The oxidation is usually practiced on burner gases resulting from the combustion of pyrites, brimstone or other sulphur containing material. The content of sulphur dioxide in burner gas varies because of several modifying factors but I have selected a composition of 7% sulphur dioxide, 10% oxygen and 83% nitrogen by volume obtained from pyrites burning as an example. In such a mixture the oxidation of sulphur dioxide to sulphur trioxide, although exothermic to the extent of about 635 B. t. u. per pound of sulphur dioxide oxidized, does not produce sufficient heat to heat up the gases entering the catalyst from room temperature to the temperature of reaction. For instance, 100 cu. ft. of these gases require about 1450 B. t. u. to raise them from ordinary temperatures to the temperature of reaction before contacting with the catalyst. Upon reaction this volume of these burner gases liberates 791 B. t. u. The heat lost in actual practice due to radiation and other losses is ordinarily so great that a large portion of the heat liberated by the combustion of the sulphur-bearing raw material, as well as the heat in the exit gases and even heat derived from the combustion of fuel, must be utilized to assist in sustaining the temperature of the converter, particularly where the content of sulphur dioxide is low. When the requisite amount of heat from these sources is transferred to the burner gas, the latter enters the catalyst at the temperature of reaction and the heat formed by the reaction must be removed to prevent superheating; otherwise it lowers the conversion yield and is, moreover, liable to injure the apparatus as well as the high efficiency of the catalyst.

Present forms of apparatus remove such injurious heat by radiation from the converter to its surroundings; by cooling through the medium of the specific heat of fluids such as gases, etc. In all of these cases the control of temperature is largely a question of experience with each individual converter. Such control is obtained by varying the temperature and rate of the incoming gases or their dilution; by varying the temperature of the gases used for cooling the catalyst chambers; by introducing these cooling gases at arbitrary points depending upon the performance of the reaction; by varying the lagging on the converter, etc. Because of this large dependence upon the specific heat of fluids as temperature controlling media, different portions of the converter vary widely in temperature. In all forms of apparatus now used the means for heat removal are comparatively crude and do not insure a constant temperature automatically maintained.

It is generally accepted that the conditions necessary for good conversion are:

(1) Uniform burning of the sulphur-containing material at the burners in order to yield a constant percentage of sulphur dioxide in the burner gas. By present methods of temperature control a variation in this condition affects the relation of heat formed in the converter to the heat removed in the same.

(2) In the Grillo process, for instance, the temperature in the converter should not exceed about 480° C. and this requirement is probably not attained in practice.

(3) The proper temperature for high conversion, although it varies in relation to the time of contact of the gases with the catalyst, lies substantially in a range whose limits are 400° C. and 480° C. using platinum as a catalyst.

(4) Steady temperatures are necessary for high conversion. Oscillation of temperature results in lowered conversions.

This automatic maintenance of constant temperature is accomplished in the present invention by the use of boiling sulphur which under a given pressure boils at a definite temperature and by its latent heat of vaporization removes heat without change of temperature. By fixing the pressure applied to the boiling sulphur it is maintained at the same temperature throughout and the control does not depend on the use of pyrometers which have definite limits to their usefulness. Because of this automatic maintenance of the temperature by means of boiling sulphur, the variations in the composition of the burner gases are of minor importance as compared with present methods of converter temperature control. Mercury may also be used for this purpose but as mercury in minute traces is liable to poison the most efficient catalyst known—platinum—a very small mercury leak is dangerous and renders its use undesirable. Sulphur, on the other hand, is not a catalyst poison and the effect of sulphur leaking into the catalyst chambers does no harm. Cost considerations and other advantages over mercury favor the use of sulphur for this purpose.

Since the principles upon which the invention is based can be more clearly explained by describing a specific set of conditions and an apparatus construction, I give this below but I do not limit myself to the type of apparatus described nor to the specific temperatures or gas mixtures stated.

The drawing represents a vertical section through a form of apparatus suitable for carrying out the process. Numeral 1 represents a shell to contain the sulphur whose upper level is shown at 2. The tubes 3 are sealed into the tube sheets 4 by joints which are tight against differential pressures. The tube sheets 4 are also sealed tightly to the shell 1 around the circumference at the points 5. A screen or perforated plate 6 is supported by means not shown so that it is in contact with the bottom of the tubes 3. The tubes are partially filled with a porous non-catalytic material 7 resting on the screen 6 and above this the catalyst 8 whose upper level is preferably below the sulphur level 2. The tubes above the catalyst may be either empty or filled with a porous non-catalytic mass. Cooling and condensing means 9 are shown wherein the sulphur vapor is condensed and returned to the body of liquid sulphur for re-use. Within the cooling means is a coil with inlet 10 and outlet 11 which contains a cooling medium. This medium may be gases which it is desired to heat, high boiling oils, steam or mercury, to transfer the heat to useful purposes, or vessels containing materials to be heated may be substituted for the coils as shown. A top section 12 with vapor inlet 13 and a bottom section 14 with vapor outlet 15 are bolted to the tube shell 1. A pipe 16 leads from the sulphur system to a pressure tank 17 with manometer 18 and means, not shown, for maintaining a constant pressure of a neutral gas on the sulphur system. The gas outlet 15 leads to a heat exchanger 19 which itself has a vapor outlet 20 leading to absorbing means, not shown. Numeral 21 represents the cold gas inlet of the heat interchanger and 22 its heated gas outlet. All parts of the system including, the converter, are heavily lagged to prevent loss of heat.

A draw-off pipe or connections serving as a means for filling the converter with sulphur are not shown. The sulphur may remain in the converter after shutting down or may be withdrawn if desired while still liquid. A melting tank for sulphur, not shown, may also be provided for filling the converter.

A horizontal section of the converter and tubes is not shown. The converter may be rectangular or circular in form. The condensing means 9 may be a spiral pipe coil as shown or any other suitable form known to the art. The tubes 3 may be welded into the tube sheets 4 or may be sealed to them by other means. The tubes containing the catalyst may be circular, rectangular or any other form in their cross-section. The tube sheets 4 may be bolted or riveted but preferably welded to the shell 1. It is to be understood that it is within the scope of this invention to place the sulphur inside tubes or chambers and the catalyst outside of those tubes in direct heat conducting relationship. Other forms of condensers for the sulphur vapor may be used wherein the vapors are condensed within the shell 1. The sulphur level 2 may reach far above the catalyst level in the tubes. The heat interchanger may be of any suitable form. Although non-catalytic material 7 is shown at the bottom of the tubes 3 supporting the catalyst, it is not essential. It is, however, desirable in this position as by this means the catalyst is raised well up above the perforated plate 6 and well within the temperature-controlled zone surrounded by the boiling sulphur.

As an example of operation, I will describe the production of sulphur trioxide by the oxidation of a burner gas of the composition stated above, using a catalyst which operates at 450° C. The apparatus is closed and the sulphur heated by means not shown, for instance, by electric heating plates against the wall of the converter, to its boiling point under a pressure which will maintain the catalyst temperature at 450° C. The sufficiently pure burner gas is then allowed to enter through the preheater 19, then to the tubes 3 where it is heated up to a temperature at which reaction will begin as soon as it contacts with the catalyst 8, by means of the latent heat received from the sulphur vapors condensing on the outside of the tubes 3 above the sulphur level 2 or by heat transferred from the boiling liquid sulphur on the outside of the tubes above the catalyst level. With mixtures of sulphur dioxide and oxygenated air, especially when imposing the higher pressures on the gas system, it is desirable to protect the tubes from superheating due to reaction of sulphur dioxide to sulphur trioxide above the catalyst by means of liquid sulphur in contact therewith. The reaction takes place in the catalyst and the hot exit gases gradually heat up the interchanger 19. When the system has reached equilibrium, the gases entering the top section 12 will be at a temperature close enough to 450° C. so that the condensing sulphur vapors or the boiling liquid sulphur can finish the preheating even with the electrical heating discontinued. The foregoing merely describes the method of starting the reaction and is seldom done as such converters should operate continuously over long periods. It is also to be understood that the system may be brought to the proper temperature for reaction by heating the sulphur by a furnace surrounding the converter or by an auxiliary sulphur heater which delivers boiling sulphur or its vapors to the converter during the heating-up stage or the converter may be brought to the temperature of reaction by introducing heated burner gases through the heat exchanger into the converter. After the entire system has reached equilibrium, the heat delivered to the converter and that generated in excess of that lost by radiation, is removed by the boiling sulphur, with no change in temperature and is transferred to the condensing means 9 where it is put to useful work. The temperature of the catalyst in the tubes can be maintained at any proper uniform and constant temperature within wide limits by regulating the pressure imposed upon the boiling sulphur. Each tube of such a converter is exposed to exactly the same outside temperatures which cannot possibly be practically attained when the tubes are cooled by the specific heat of a fluid such as the gas cooling heretofore used or where the attempt is made to control the catalyst temperature by radiation to variable surroundings.

By using a preheater and transferring a large part of the heat in the exit gases to the gases entering the converter, it is obvious that the entire heat generated, except for that portion which is lost by unavoidable radiation from parts of the equipment, can be delivered at a single point and efficiently utilized for preheating burner gases, for power generation, for the concentration of dilute sulphuric acid sometimes obtained in the purification of the burner gases, etc.

The rate of heat removal per unit of surface, time and temperature differential, within the temperature ranges involved to a boiling liquid is so great that a small converter operating under the principles of this process has a production capacity which cannot be equaled by existing types of apparatus. This greater production can be accomplished by increasing the pressure on the reacting gases, thus increasing the amount of gases passing through without decreasing the time of contact below that required. This operation is applicable to synthetic mixtures of sulphur dioxide with air or with oxygenated air. With present types of apparatus such mixtures are either impractical or impossible to operate owing to the inability of the converter to dissipate the heat except at very low rates of gas feed, which would nullify the capacity advantage that is the main object of using richer sulphur dioxide-oxygen mixtures.

The drawing shows a heat interchanger whereby the heat in the exit gases is utilized to heat the inlet gases. It is to be understood that my invention is not to be limited to the use of this heat as the inlet gases may be preheated, if necessary, by a preheater heated by any convenient means or by the ordinary heater-coolers which utilize the heat of combustion of the sulphur-bearing raw materials. Furthermore, without departing from the spirit and scope of my invention, I may use a converter whose temperature is controlled by boiling sulphur in series with catalytic chambers whose temperatures are controlled by other means. For example, catalyst chambers constructed on the principle of a Mannheim oxide shaft, a Mannheim platinum shaft, a Grillo platinum converter and others known to the art may be substituted by or put into series with a converter based upon the principles of my invention. For instance, the top section 12 may be made of a greater height than as shown and arranged to duplicate the radiation chamber of a Tantelew converter. Here the temperature of reaction will be high, which increases the velocity of reaction, but the conversion of sulphur dioxide to sulphur trioxide will not be complete. The conversion is then completed in the tubular portion below the radiation chamber, which portion is under the temperature controlling influence of the boiling sulphur. Furthermore, the burner gases may be purified by any desirable means before contacting with the catalyst or in the case of using burner gas from sulphur containing no catalyst poisons, such as arsenic, lead, selenium, water vapor and the halogens, the burner gas may be injected directly into the converter at the temperature that the gases are delivered from the burners and the sensible heat transferred to useful purposes as latent heat of vaporization of sulphur. Although in the drawing and in the description of the operation of the converter as shown, the gases pass downwardly through the catalyst, it is to be understood that my process is not limited to a specific directional flow of gas. My process is not restricted to the use of any one catalyst as it is applicable to the use of any catalyst which functions within a range of temperature which can be controlled and maintained by sulphur boiling under pressures above or below atmospheric.

Claims:

1. In the oxidation of gaseous sulphur dioxide by means of catalysts and oxygen-containing gases the step which comprises regulating the temperature of the reaction by means of boiling sulphur.

2. In the oxidation of gaseous sulphur dioxide by means of catalysts and oxygen-containing gases the step which comprises regulating the temperature of the reaction by means of boiling sulphur under an applied pressure.

3. In the oxidation of gaseous sulphur dioxide by means of catalysts and oxygen-containing gases the step which comprises surrounding the catalyst containers by boiling sulphur.

4. In the oxidation of gaseous sulphur dioxide by means of catalysts and oxygen-containing gases the step which comprises surrounding the catalyst containers by boiling sulphur and regulating the temperature of the boiling sulphur by means of the pressure applied to it.

5. In the oxidation of gaseous sulphur dioxide by means of catalysts and oxygen-containing gases the step which comprises surrounding the catalyst containers by boiling sulphur and regulating the temperature of the boiling sulphur by means of the pressure applied to it and preheating the gases before contacting with the catalyst by means of the boiling sulphur.

6. In the oxidation of gaseous sulphur dioxide by means of catalysts and oxygen-containing gases the step which comprises surrounding the catalyst containers by boiling sulphur and regulating the temperature of the boiling sulphur by means of the pressure applied to it and preheating the gases before contacting with the catalyst by means of the sulphur vapor.

7. In the oxidation of gaseous sulphur dioxide by means of catalysts and oxygen containing gases, the step which comprises surrounding the catalyst containers with boiling sulphur and maintaining the sulphur in the state of boiling by the application of heat from an outside source.

8. In the oxidation of gaseous sulphur dioxide by means of a catalyst and air, the step which comprises regulating the temperature of the reaction by means of boiling sulphur.

9. In the oxidation of gaseous sulphur dioxide by means of a catalyst and air, the step which comprises regulating the temperature of the reaction by means of boiling sulphur under an applied pressure.

10. In the oxidation of gaseous sulphur dioxide by means of catalysts and air, the step which comprises surrounding the catalyst containers by boiling sulphur and regulating the temperature of the boiling sulphur by means of the pressure applied to it.

11. In the oxidation of gaseous sulphur dioxide by means of a catalyst and air to which more oxygen has been added, the step which comprises regulating the temperature of the reaction by means of boiling sulphur.

12. In the oxidation of gaseous sulphur dioxide by means of a catalyst and air to which more oxygen has been added, the step which comprises regulating the temperature of the reaction by means of boiling sulphur under an applied pressure.

13. In the oxidation of gaseous sulphur dioxide by means of catalysts and oxygen-containing gases, the step which comprises maintaining the mixed sulphur dioxide and oxygen-containing gas at a pressure substantially above atmospheric while the mixed gases are in the catalyst containers and surrounding the catalyst containers by boiling sulphur.

14. In the oxidation of gaseous sulphur dioxide by means of catalysts and oxygen-containing gases, the step which comprises maintaining the mixed sulphur dioxide and oxygen-containing gas at a pressure substantially above atmospheric while the mixed gases are in the catalyst containers and surrounding the catalyst containers by boiling sulphur and regulating the temperature of the boiling sulphur by means of the pressure applied to it.

15. The process for the production of sulphur trioxide which comprises oxidizing sulphur dioxide by an oxygen-containing gas in the presence of a catalyst in a portion of the apparatus in which the temperature is maintained at a high point so as to give a high reaction speed with incomplete conversion of the sulphur dioxide to sulphur trioxide and completing the reaction in a second portion of the apparatus where the catalyst containers are surrounded by boiling sulphur.

16. The process for the production of sulphur trioxide which comprises oxidizing sulphur dioxide by air in the presence of a catalyst in a portion of the apparatus in which the temperature is maintained at a high point so as to give a high reaction speed with incomplete conversion of the sulphur dioxide to sulphur trioxide and completing the reaction in a second portion of the apparatus where the catalyst containers are surrounded by boiling sulphur.

17. The process for the production of sulphur trioxide which comprises oxidizing sulphur dioxide by an oxygen-containing gas in the presence of a catalyst in a portion of the apparatus in which the temperature is maintained at a high point so as to give a high reaction speed with incomplete conversion of the sulphur dioxide to sulphur trioxide and completing the reaction in a second portion of the apparatus where the catalyst containers are surrounded by boiling sulphur and the temperature of the sulphur regulated by an applied pressure.

18. The process for the production of sulphur trioxide which comprises oxidizing sulphur dioxide by air in the presence of a catalyst in a portion of the apparatus in which the temperature is maintained at a high point so as to give a high reaction speed with incomplete conversion of the sulphur dioxide to sulphur trioxide and completing the reaction in a second portion of the apparatus where the catalyst containers are surrounded by boiling sulphur and the temperature of the sulphur regulated by an applied pressure.

In testimony whereof, I hereby affix my signature.

CHARLES RAYMOND DOWNS.